Patented Apr. 5, 1938

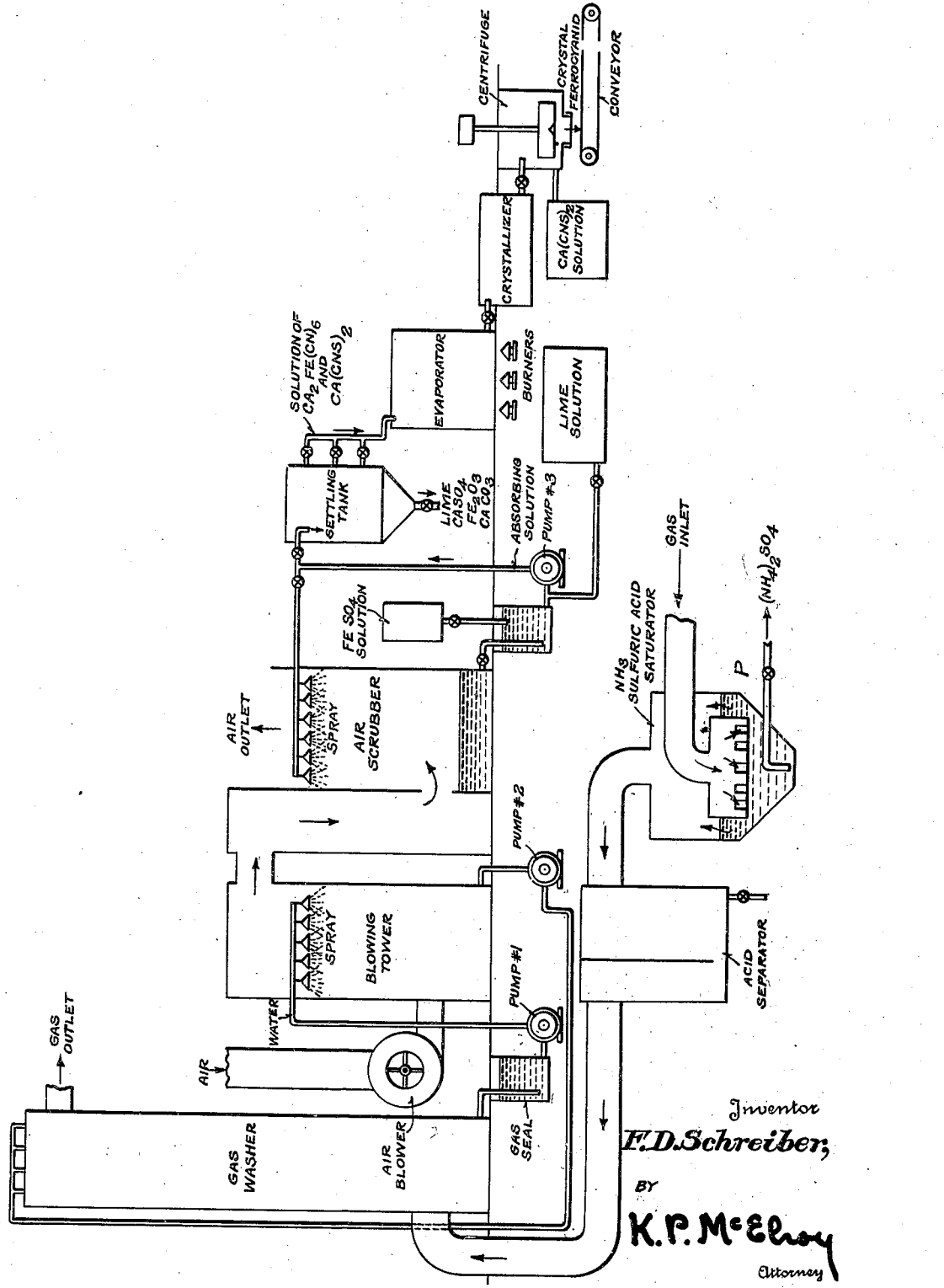

2,113,002

UNITED STATES PATENT OFFICE 2,113,002

PURIFYING COKE OVEN GAS

Fredrick D. Schreiber, Dormont, Pa.

Application August 31, 1934, Serial No. 742,309
Renewed February 4, 1938

2 Claims. (Cl. 23—3)

This invention relates to purifying coke oven gas; and it comprises a process of recovering the fixed nitrogen of coal gas in several commercially available forms by first scrubbing the gas with hot sulfuric acid to obtain ammonium sulfate, then scrubbing the hot gas with cold water which removes cyanogen and sulfur compounds and cools the gas, then cooling the water for reuse by blowing with air and scrubbing the air with a circulating liquid suspension of calcium hydroxid to which a ferrous salt is added out of contact with the air so that HCN taken from the water by the air is converted to soluble calcium ferrocyanid and recovered as such after separation from calcium sulfocyanid formed from sulfurous gases carried by the air; all as more fully hereinafter set forth and as claimed.

As is well known, in the manufacture of gas and coke by distilling coal, recovery of byproducts aids materially in defraying the cost of operation. The main commercial byproducts are tar, light oils (benzol) and fixed nitrogen, as ammonia.

All coal carries nitrogen in fixed form and much of this reappears in the gas as ammonia, $NH_3$. Some reappears in the form of cyanogen compounds; probably mostly as free HCN and, while this can be recovered directly from the gas by various methods, it is not customarily done, as these methods would interfere with the regular and standardized routine of a recovery plant. The amount of HCN in the gas is relatively small and it is simply not worth while to alter old-established practice to recover it. The HCN is therefore usually treated merely as an annoying impurity to be gotten rid of in the easiest way.

The gross amount of fixed nitrogen in cyanid form going to waste daily in a modern large coking or gas plant is however large enough to make it economically important. In the present invention, I have devised a way in which it can be readily recovered in a commerically salable form, as a ferrocyanid, without in any way interfering with standard byproduct recovery practice. As a matter of fact, equipment for HCN recovery by my method can be added to existing equipment without in any way changing the latter or interfering with the flow of gas. Nothing new is placed in the flow of gas, but a large part of its contained cyanogen is nevertheless recovered in useful form.

By the use of the present invention, a larger proportion of the fixed nitrogen of the coal is recovered in salable form than where only the ammonia is recovered. The recovery means hereinafter described are cheap and simple and are not expensive in operation.

In an ordinary routine in purifying gas, the gas is first cooled to condense tar and oils and is then reheated and passed through sulfuric acid which converts the contained ammonia into ammonium sulfate. The heat of the gas and that produced by the neutralization of the acid keep the liquid hot and the gas remains hot. Ammonium sulfate crystallizes out and a concentrated magma of crystals and mother liquor is removed from time to time. There may be a condensation of ammoniacal water ahead of the sulfuric acid saturator, this depending upon the type of recovery plant in operation. Where ammoniacal water condenses and is collected, however, it is ordinarily simply distilled with an addition of lime and the $NH_3$ gas sent back into the line ahead of the sulfuric acid saturator. The hot gas leaving the saturator and freed of ammonia contains much water vapor and it is customarily cooled to remove the bulk of the water prior to sending the gas forward for further purification. In cooling, a water spray of cold water can be used and this flows away, together with condensed moisture from the gas. All this is standard practice. The water leaves the system rather warm at a temperature of about 35° C., and it contains much, or most, of the original CN of the gas, mainly as HCN. It also contains $H_2S$.

I have found that by cooling this hot water by air blown in countercurrent contact, most of the contained HCN and $H_2S$ go forward with the air. The air leaving the cooler contains HCN and $H_2S$ and sometimes $C_2N_2$ in small amount. The amount of these gases per cubic foot of exhaust air is very small, but the total amount of HCN carried by the air in a day in an ordinary sized coke oven plant is quite large.

By treatment of the distillation gases of coal with a base and ferrous oxid in some form, ferrocyanids can be produced. A mixture of ferrous sulfate and lime can be used. This is one of the gas purification methods mentioned above and while it is practicable with gas, since no air is present to oxidize the ferrous oxid, it is not in use; it is not desirable to put an intermediate piece of apparatus in the ordinary gas purifying train. In the present invention HCN is recovered from the air blown through the water used for washing the gas.

I have found that, with proper manipulation, most of the HCN carried in the air can be recovered in the form of ferrocyanid with only a small proportion forming sulfocyanid and with most of the H₂S going away in the air. Ferrous compounds generally are, of course, converted quickly to ferric compounds by the oxygen of the air. For this reason air is carefully excluded when absorbing HCN from coal gas by treatment with ferrous oxid and alkali to form ferrocyanid. Similarly, sulfids and cyanids react under oxidizing conditions to form sulfocyanids, while in the absence of air this rection does not occur to any great extent. The conversion to ferrocyanid of HCN carried together with H₂S in a large volume of air presents a special and somewhat complex problem.

I have found, and rather unexpectedly, that a method employing a ferrous compound and a base can be used for forming ferrocyanid from the cyanogen compounds contained in small proportions in the air. In using ferrous oxid, as in using lime and ferrous sulfate, I do not put the ferrous oxid in the direct path of the air. Instead, I scrub the air with lime water, thereby forming calcium cyanid; the scrubbing liquid, a suspension of hydrated lime in water, flowing in closed circuit to, through and away from the scrubber. At a point in this cyclic flow outside the scrubber, I add ferrous sulfate. I find that the production of ferrocyanid is so quick that in operating in this way air has no injurious oxidizing influence and sulfocyanid formation can be reduced to a minimum.

In the practice of my invention, the gas coming from the ovens, after being cooled for removal of tar and ammonia liquor, is again heated and freed of ammonia by passage through the sulfuric acid saturator. The gas now contains HCN and H₂S in amounts of the order of 70 to 80 grains HCN per 100 cubic feet and about 400 grains H₂S per 100 cubic feet and is washed with cold water which dissolves HCN (and C₂N₂) and H₂S. After the washing, the gas may retain 20 to 25 grains HCN per 100 cubic feet and usually something less than 400 grains H₂S. The water thus removes from the gas the greater part of the HCN and only a small part of the H₂S; the wash water holding these gases in solution in small concentrations and the gas being cooled from an initial temperature of about 55–60° C. to 20 or 30° C., depending upon the season of the year. The water leaves the washer at a temperature of 30 to 35° C., also depending upon the season. The wash water is then blown with air, advantageously in a tower into which the water is sprayed at the top and the air is blown upwardly in countercurrent to falling sprays of the water. Blowing of the water with air cools the water and removes from it nearly all of the dissolved HCN and H₂S, the cooled water being returned to the gas washer for reuse so that there can be no loss of the valuable HCN. The air used varies in quantity so that it contains HCN in amounts varying from 5 to 50 grains per 100 cubic feet. The H₂S content usually varies from 0 to 15 grains per 100 cubic feet.

In recovering the HCN, including C₂N₂, from the air by conversion to ferrocyanid, the air is scrubbed continuously by a descending spray of an aqueous suspension of hydrated lime circulating continuously through a scrubbing tower with addition of a solution of ferrous sulfate to the lime suspension at a point outside of the scrubber and out of contact with the air being scrubbed, the air being passed through the scrubber upwardly in countercurrent to a descending spray of lime suspension and being discharged into the atmosphere from the top of the scrubber. In the circulation of the lime suspension through the scrubber, it becomes charged with calcium cyanid in solution and this reacts with the ferrous sulfate added outside of the scrubber to form calcium ferrocyanid in solution. The addition of ferrous sulfate outside of the scrubber is proportioned to correspond with the charging of the lime suspension with calcium cyanid in the scrubber. Regulation need not be exact. Any excess of ferrous sulfate added to the suspension reacts with calcium ferrocyanid previously formed to form a ferrous ferrocyanid compound or ferrous cyanid. As I have found, neither the calcium ferrocyanid nor the ferrous ferrocyanid is oxidized by the air in the absorber. Any ferrous sulfate added to the suspension over and above that forming a ferrous cyanid compound by reaction with calcium ferrocyanid would remain in the suspension as ferrous hydroxid and this would be oxidized by the air to ferric hydroxid. However, the H₂S carried in the air is absorbed to some extent by the lime suspension with formation of calcium sulfhydrate, and this has a tendency to restrict the oxidation of any ferrous hydroxid carried in the lime suspension into the absorber, and to cause formation of calcium sulfocyanid. By adding the ferrous sulfate in sufficient quantity to react with the calcium cyanid formed in the absorber, the formation of calcium sulfocyanid occurs only to a small extent, and as the reaction between the lime and the H₂S in the air is a mass reaction, it also occurs only to a small extent and the H₂S for the most part passes out with the air without being absorbed. In practice, it is a simple matter to add the ferrous sulfate outside of the absorber at a rate commensurate with the formation of calcium cyanid in the absorber. The ferrous ferrocyanid formed by reaction of ferrous sulfate with calcium ferrocyanid is reconverted to calcium ferrocyanid by the calcium cyanid formed in absorbing more HCN from the air in the absorber.

When the concentration of calcium ferrocyanid builds up in the scrubbing liquid to a suitable point, a portion of the liquid is removed from the circulating system and replaced by additional lime suspension. The withdrawn portion of scrubbing liquid is allowed to settle to separate excess residual lime, and the insoluble calcium sulfate formed in the reaction producing calcium ferrocyanid. A small amount of ferric oxid from various sources and calcium carbonate are usually present in the insoluble matter. The lime being always in excess there is no loss of cyanogen as Prussian blue or similar compounds. The insoluble sludge is separated and the clear solution of calcium ferrocyanid containing a small amount of calcium sulfocyanid is evaporated and cooled for crystallization of the ferrocyanid leaving the sulfocyanid in the mother liquor. The mother liquor can, if desired, be utilized in the production of commercial sulfocyanids. Crystallized calcium ferrocyanid is a valuable product, salable as such. It is readily converted to sodium or potassium ferrocyanid by treatment in solution with sodium or potassium carbonate, respectively.

In the accompanying drawing, I have shown diagrammatically a flow sheet of the process illustrating the arrangement of apparatus for carrying it out.

This flow sheet shows the main flow of gas as exhausted from the tar condensers entering the sulfuric acid saturator under slight pressure.

After leaving the saturator, the gas passes through an acid separator and thence through the gas washer where it is washed with water. The gas passes forward from a gas outlet in the gas washer and the cyanogen compounds are recovered from the wash water in the remainder of the apparatus indicated in the drawing, the main flow of gas going from the washer outlet usually to means (not shown) for residual benzol recovery and other purification steps forming no part of the present invention.

In scrubbing the air for conversion of its contained HCN, I find it advantageous to use lime as the alkaline reagent. The process can be worked with substitution of other alkalies, such, for example, as sodium carbonate, for the lime. I find it better usually to use lime because of its caustic properties. When sodium carbonate is used, $CO_2$ is set free and somewhat complicates the reactions occurring in the scrubber. Lime also has the advantage that it forms an insoluble sulfate readily separated from the solution of calcium ferrocyanid. When soda is used, separation of sodium sulfate from the ferrocyanid by fractional crystallization is required. Lime is a cheap alkali and the small amount wasted in the insoluble sludge is of small moment.

The described addition of ferrous sulfate to the circulating alkaline liquid at a point outside of the air scrubber is important in several respects. It prevents oxidation by the air of ferrous oxid formed by the alkali reacting with the ferrous salt. This in turn prevents oxidation of $H_2S$ to elemental sulfur with consequent sulfocyanid formation. Ferrous sulfate added in amounts corresponding to the absorption of HCN from the air by the circulating liquid forms ferrous cyanid compounds and restricts sulfocyanid formation, giving conversion to ferrocyanid of a predetermined proportion of the HCN scrubbed from the air. The ferrous iron required can, of course, be supplied by ferrous compounds other than ferrous sulfate. Ferrous salts generally are useful. Ferrous chlorid when available may be used and, if desired, ferrous hydroxid from any source, precaution being taken to prevent its oxidation to ferric oxid. Ferrous sulfate is however usually the most convenient and economical reagent to use.

In the manufacture of ferrocyanid from gaseous HCN in the presence of $H_2S$, I regard locating the source of ferrous iron supply outside the path of gas as being important. It is an important improvement in the method of making ferrocyanid to absorb the HCN at one point in the flow of scrubbing liquid and to supply ferrous iron at another point.

As above described, the process has the advantage of converting the HCN contained in the air in the presence of $H_2S$ into ferrocyanid for the most part and of keeping sulfocyanid formation at a minimum. I regard the sulfocyanid formation to be due in part to reaction of small amounts of cyanogen gas, $C_2N_2$, with $H_2S$, forming HCN and HCNS. However, if it should be desired to increase the proportion of sulfocyanid produced, this can be readily accomplished by allowing iron hydroxid to enter the air scrubber and to react directly with the air oxygen in the presence of HCN and $H_2S$. If the amounts of $H_2S$ in the air are unduly small, sulfocyanid formation can be increased by addition of $H_2S$ or sulfurous gases to the air entering the blower supplying air to the blowing tower. Ferric oxid and $H_2S$ form free sulfur which unites with HCN to form HCNS combining with the lime. Thus, an excess of ferrous sulfate added to the scrubbing liquid gives ferrous hydroxid which is oxidized by the air to a ferric compound which catalyzes formation of calcium sulfocyanid in the air scrubber.

What I claim is:—

1. In purifying coke oven gas, the process of recovering fixed nitrogen therefrom in commercially available forms which comprises scrubbing the gas with hot sulfuric acid to abstract $NH_3$ therefrom as ammonium sulfate, washing the hot acid-treated gas with cold water to remove HCN and $H_2S$ therefrom, blowing the effluent wash water with air to remove HCN and $H_2S$ and to cool the water for reuse, scrubbing the air used in blowing with an alkaline liquid circulated cyclically, adding a ferrous compound to the circulating scrubbing liquid out of contact with the air so as to convert HCN taken from the water by the air to alkali ferrocyanid in solution in the liquid and crystallizing the ferrocyanid from the liquid.

2. In the process of claim 1, scrubbing the air with a calcium hydroxid suspension and adding ferrous sulfate to the suspension at a point removed from the air scrubbing.

FREDRICK D. SCHREIBER.